United States Patent [19]
Ecker

[11] Patent Number: 6,148,989
[45] Date of Patent: Nov. 21, 2000

[54] CONVEYING AND ROTATING DEVICE AND ITS USE

[76] Inventor: Peter M. Ecker, W27062 State Rd. 35, Trempealeau, Wis. 54661

[21] Appl. No.: 09/152,649

[22] Filed: Sep. 14, 1998

Related U.S. Application Data

[63] Continuation-in-part of application No. 08/500,438, Jul. 10, 1995, Pat. No. 5,806,686.

[51] Int. Cl.⁷ .............................. B65G 17/32; B05C 5/00
[52] U.S. Cl. .......................... 198/387; 198/779; 209/912; 209/919; 118/24; 118/DIG. 6
[58] Field of Search ..................................... 198/387, 779; 209/912, 919; 118/24, 308, DIG. 6

[56] References Cited

U.S. PATENT DOCUMENTS

| | | |
|---|---|---|
| 665,365 | 1/1901 | Ferguson . |
| 1,417,266 | 5/1922 | McDill . |
| 2,178,185 | 10/1939 | Nicholson ............................... 146/202 |
| 2,287,447 | 6/1942 | Peeples ................................... 146/202 |
| 2,592,275 | 4/1952 | Grosvenor ............................... 198/786 |
| 3,818,859 | 6/1974 | Kalmar .................................... 118/24 |
| 3,918,571 | 11/1975 | Noguchi ............................. 198/779 X |
| 4,380,294 | 4/1983 | Morris ..................................... 209/658 |
| 4,789,290 | 12/1988 | Barnhart et al. ........................ 198/786 |
| 5,024,335 | 6/1991 | Lundell .................................... 209/615 |
| 5,029,692 | 7/1991 | Warkentin ........................... 209/912 X |
| 5,280,838 | 1/1994 | Blanc ................................. 209/912 X |
| 5,285,548 | 2/1994 | Moll .......................................... 15/3.2 |
| 5,749,990 | 5/1998 | Rello et al. .......................... 198/779 X |
| 5,897,797 | 4/1999 | Drouillard et al. .................. 101/3.1 X |

FOREIGN PATENT DOCUMENTS

| | | | |
|---|---|---|---|
| 7703119 | 9/1978 | Netherlands ............................ 209/658 |
| 42869 | 5/1926 | Norway .................................. 209/658 |

*Primary Examiner*—Tuan N. Nguyen
*Attorney, Agent, or Firm*—M. Paul Hendrickson

[57] ABSTRACT

There is provided a device for individually conveying and rotating pieces within individual cavities for each piece. The device includes a continuous conveyor equipped with a repetitive series of axially mounted brushes matingly cavitatied so as to receive the individual pieces. Rotation of the conveying brushes is effectuated by a mobile or stationary aprons which causes the brushes to rotate. Numerous materials (e.g. labels, etc.) and treating agents (e.g. cleaning, rinsing, waxing, polishing agents, etc.) may be applied to the rotating pieces which permits many diverse processing steps to be conducted upon the conveying and rotating pieces.

20 Claims, 4 Drawing Sheets

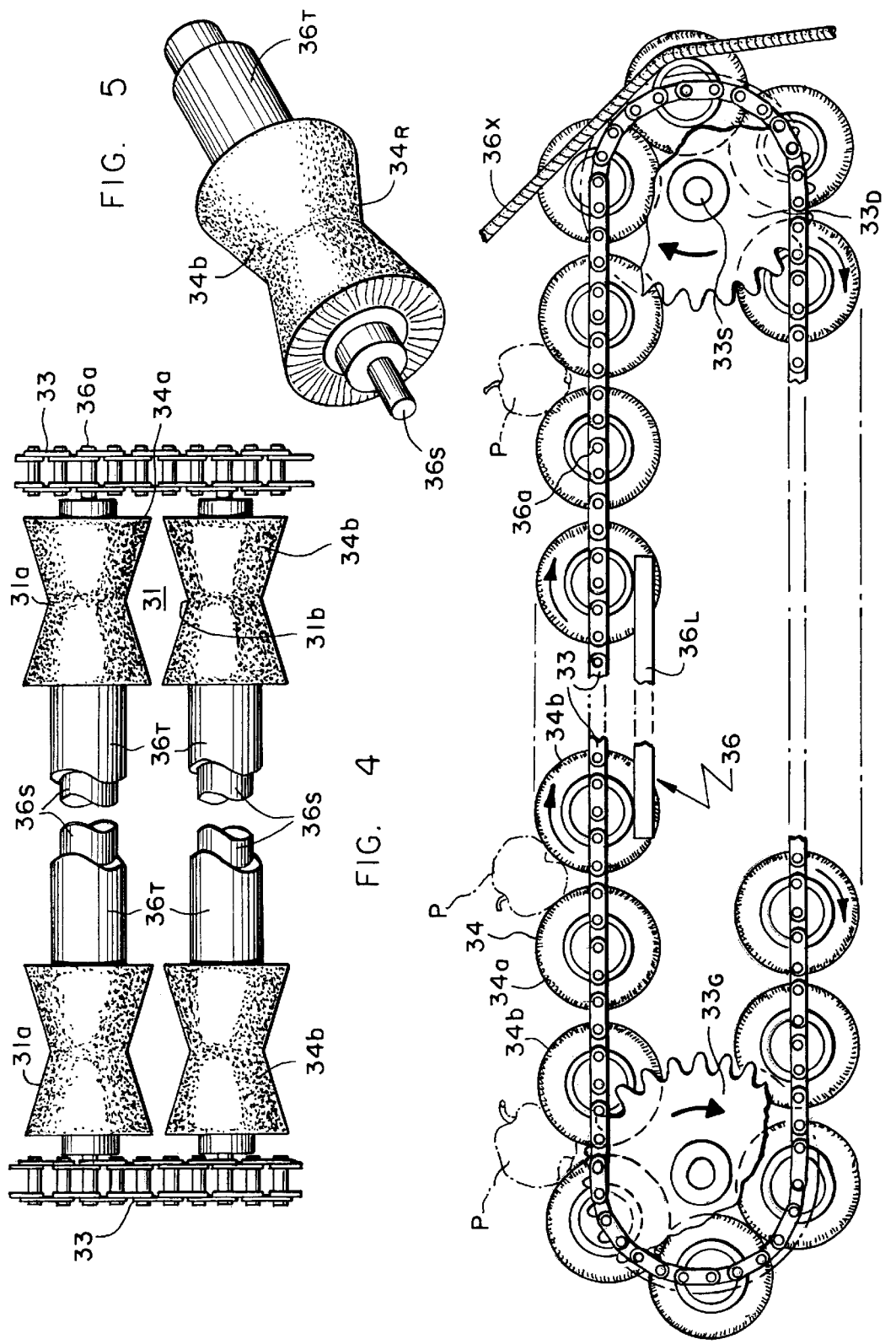

6,148,989

CONVEYING AND ROTATING DEVICE AND ITS USE

The application is a continuation-in-part to U.S. patent application Ser. No. 08/500,438 filed on Jul. 10, 1995 entitled "Sorting Device and Its Use.", now U.S. Pat. No. 5,806,686.

FIELD OF THE INVENTION

The present invention relates to conveying and rotating machines and more particularly to machines for use in conveying and applying materials to rotating spherical pieces and the processing thereof.

BACKGROUND OF THE INVENTION

Numerous goods must be processed or treated in some form or manner in order to place the product in a consumable form. Freshly harvested produce is an exemplary product normally requiring further treatment before it may be shipped in commerce. Raw produce typically requires treating of the produce which generally includes treating the produce with various treating agents such as cleansing, sanitizing, waxing and polishing agents needed to place the produce in condition for shipment and human consumption. This is exemplified by the conveying and cleaning of produce pieces such as fruits and vegetables which processing has changed little over the last several decades. Most fruits and vegetables have a delicate and often fragile protective skin which, when marred or skinned, renders the produce susceptible to premature spoilage. Produce pieces such as fruits and vegetables are typically mechanically conveyed and cleaned in mass. The movement of the produce pieces upon mechanical conveyors typically relies upon the produce pieces themselves to force and advancely move the produce pieces along the conveyor system. The conveying and cleaning operation under these conditions causes the produce pieces to be co-mingled, bumped, impacted and pushed as they proceed together along the path or the conveyor. The machinery and its operation causes the produce pieces to be impacted and jammed against one another. As a result, substantial damages to the produce pieces such as puncturing, bruising, skinning, abrasions and cutting will typically occur during the treatment and conveying operation.

The seriousness of the processing problem is typified by the use of cleaning and conveying equipment to prepare apples and other damagable produce for shipment. In apple processing plants, freshly picked or unclean and stored apples are typically placed in a large holding vat partially or fully filled with an aqueous cleansing solution. The apples being less dense than water tend to float within the holding tank. Conventionally, a large continuous apron equipped with rubber slats engages the buoyant apples and force feeds the apples from the vat to an apple washing and drying chamber. In the washing and drying chamber the rolling movement of the apples being processed propels the apples through the chamber. Puncturing of the skin by apple stems along with bruising and abrasion of a significant number of the processed apples inherently arises during this processing stage as well as the other processing stages. Since it is usually desirable to protectively coat the apples with a wax coating, an aqueous wax solution is frequently applied to the cleaned and dried apples which again necessitates subjecting the apples to further conveyance and mass movement through another drying chamber until they are sufficiently dried for forwarding to the apple polishing rolls which remove any residual moisture and typically polish the apples to a highly attractive polished apple product. Mass intermingling and pushing of the apples during this processing stage again gives rise to substantial damage losses. Wax accumulation upon the conveying equipment leads to costly down-time to clean wax deposits from the machinery and maintenance or replacement of equipment parts.

The current processing plants must also necessarily conduct a number of sequential processing steps involving separate equipment and separate labor intensive stagewise requirements to produce the desired end product. Thus, substantial time, expenses and effort are required to process a raw produce to a finished produce product for distribution and consumer consumption. For example, the processing of apples by such produce plants is costly. The machinery needed to clean, convey, dry, apply an aqueous pre-wax coating, dry and then to polish the wax coated apples typically necessitates a capital investment of several hundred thousand dollars even for a small family-owned operation. Due to the costly capital investments needed to equip and operate an apple processing plant, only the larger producers are blessed with sufficient resources and capacity to conduct such capital and labor intensive operations.

The dilemma confronting the apple processing producers is compounded by the substantial processing damages to the apples simply by the manner in which they are necessarily processed. Certain importing countries such as Japan have stringent produce importation requirements. Damaged and spoiled produce are often prohibited from importation. Since significant damage significant damage arises by processing with current equipment, domestic produce processed with conventional equipment and processing conditions usually cannot meet the stringent foreign importation requirements for produce, such as required by Japan. Potential export marketing of such blemished produce is not feasible with existing equipment and operating conditions. The processing of more fragile produce such as freshly ripened tomatoes, peaches, apricots, etc. creates a processing situation in which the produce susceptibility to damage poses an even greater problem. Produce processing plants and produce growers often, by necessity, produce and process partially ripened or green produce so as to reduce the amount of damage and spoilage caused through the use of existing processing equipment. Many produce consumers would desire a more mature ripened produce if it were available.

There exists a need for processing equipment which would significantly reduce the level of damage and spoilage caused by such processing equipment. Processing equipment capable of isolating and separately treating and processing individual produce pieces would result in a substantial reduction in damage and produce spoilage. Compact cleaning and conveying equipment which would eliminate the need for bulky drying chambers or prolonged drying intervals would also result in substantial savings in capital investment and labor. A conveying and cleaning machine comprised of conveying brushes which would clean, partially dry, allowance for the application of a wax or other treating agent and dry the applied wax sufficiently to permit the wax coated produce to be polished (without resulting in a conventional excessive wax build-up upon the polishing rolls) would fulfill a long awaited need. A conveying and applying system which would permit produce pieces to be treated with treating agents and an effective retrieval of treating agent excesses for reuse would represent a substantial savings in treating agent costs to the producer. A compact process which would clean, apply wax and dry the produce sufficiently for polishing in a continuous conveyor would represent a substantial departure from prior art processing operations. Equipment and processing conditions which would permit the cleaning, wax application and necessary drying to be conducted upon a conveying brush and cleaning system would afford definitive processing advantages to produce processors over current equipment and processing conditions. Such a unique processing operation would also facilitate the production rate and capacity of processing plants. A wax applying system which would apply the wax to the produce, allow the waxed produce to be forwarded to the polishing rolls and continuously remove excess wax from developing within the conveying system would alleviate a current need to periodically stop operation and clean wax from the processing equipment as well as costly equipment replacements.

SUMMARY OF THE INVENTION

The present invention provides a device and a continuous method for separately conveying and applying materials to pieces restrained within individual cavities while rotating the pieces therewithin. The conveying and applying device is particularly well suited for the processing of rounded pieces and especially fruits and vegetables. The device includes:

a) a continuous conveyor equipped with a multiplicity of individual cavities for individually retaining and rotating a rounded piece within each of said cavities;

b) a repetitive series of rotatable brushes axially mounted to said conveyor with said brushes respectively being comprised of brushing bristles radiating outwardly from a shaft axially mounted to a supportive frame for said conveyor with the bristles of said brushes collectively providing a recessed concave region which, in cooperative relationship with adjacent bristles of an adjacently positioned brush correspondingly equipped with an adjacently mating recessed concave region, form the individual cavities for separately retaining the rounded piece while conveying and treating the piece therewithin;

c) conveying means for conveying the cavities carried by said continuous conveyor; and d) rotating means for axially rotating the brushes so as to cause a rotational movement of the piece within said cavities while conveying and rotating the piece retained within said individual cavities.

The applying and conveying device of this invention may be suitably equipped with suitable conveying means for conveying while applying materials to the rotating pieces being conveyed by the device. The conveying and applying devices include a unique series of individual cavities equipped with continuously or intermittently rotating surfaces laterally disposed between cavitated members and carried by a continuous conveyor. The cavities serve to separately transmit, within each cavity, a single rounded piece, such as a produce piece from a suitable feed source such as a produce holding tank while also imparting a rotationally brushing movement against the piece so as to effectuate the desired surface treatment or application of extrinsic material to the rotating piece. While transporting the piece, the cavitated members, such as the rotating brushes, gently brush against the produce piece in a unitary direction causing a rotational movement of each piece within each cavity. The rotational movement permits the device to uniquely apply a broad range of diverse materials to the rotating pieces. Grooved cylindrical brushes sized to receive the pieces are laterally positioned and axially mounted to a continuous chain conveyor so as to provide a series of continuous conveying and treating or applying cavities. The cylindrical brushes include recessed bristled regions in corresponding juxtaposition to an adjacent recessed bristled region of an adjacently positioned brush in a repetitive sequence of the brushes so as to provide a series of conveying and treating cavities.

A particular suitable arrangement for the conveying and rotating device of this invention entails equipping a series of axially mounted shafts or rollers with cylindrical brushes circumscribingly grooved so as to provide a channeled margin or recessed region for retaining or nesting a portion of the produce piece therewithin. Each roller may be fitted with one or more cylindrical brushes having bristles arranged upon roller so as to provide a grooved or concave recessed region contoured to partially receive and seat the conveyed piece therewithin. The grooved recessed region preferably circumscribes each roller in a mating relationship to its adjacent rotators so that the rotation of any given brush will not alter the configuration of the cavities between adjacently positioned brushes or the transported piece.

The conveying and applying machine includes a drive means for axially rotating the pieces preferably at a predetermined rotational speed. This may be accomplished by rotating the brushes while laterally moving the brushes across a stationary or moving platform which, in turn, causes pieces such as produce pieces carried by the cavities to undergo a rotational movement while being transported across the platform. The rotational movement of the transported piece is due to the rotational effect the bristles of the brushes have upon the produce pieces as the bristles sweep across the surface of the produce piece. The brushing and rotational movement of the piece provides a particularly effective environment for treating or applying a material to the rotating pieces with a host of treating agents or extrinsic materials while the pieces are rotated within the conveying cavities. For example, cleaning reagents, solvents, coating agents, waxes, microbiocides or disinfectants applied to the rotating pieces to effectuate a cleansing, coating, polishing and/or sanitation of the produce pieces within the cavities. By combining the device with a label applicator, the device may be utilized effectively to apply labels to rounded objects.

Rotational movement of the cavitated brushes may be effectuated by fitting each shaft of each brush with a tractional surface and an interfacing locomoting surface positioned in an interfacing relationship to the tractional surface so that interfacial contact and movement of the tractional surface upon the interfacing surface causes rotational movement of the shaft and its attached brushes. A rubber winding about brush shaft provides an effective tractional surface for locomoting the brush shafts. A stationary apron or mobile apron operated at varying interfacing speeds so as to variable the rotational speed or direction of the brushes may be effectively used to impart appropriate axial rotation to the brushes.

BRIEF DESCRIPTION OF THE DRAWINGS

FIG. 3 is a cross-sectional view of the feed conveyor taken along lines 15—15 of FIG. 2.

FIG. 4 is a partial top view of the feed conveyor shown in FIG. 3.

FIG. 5 is an elevational side view showing in greater detail an unpaired retaining member assembly shown in FIG. 4.

DETAILED DESCRIPTION OF THE INVENTION

Figure 1:
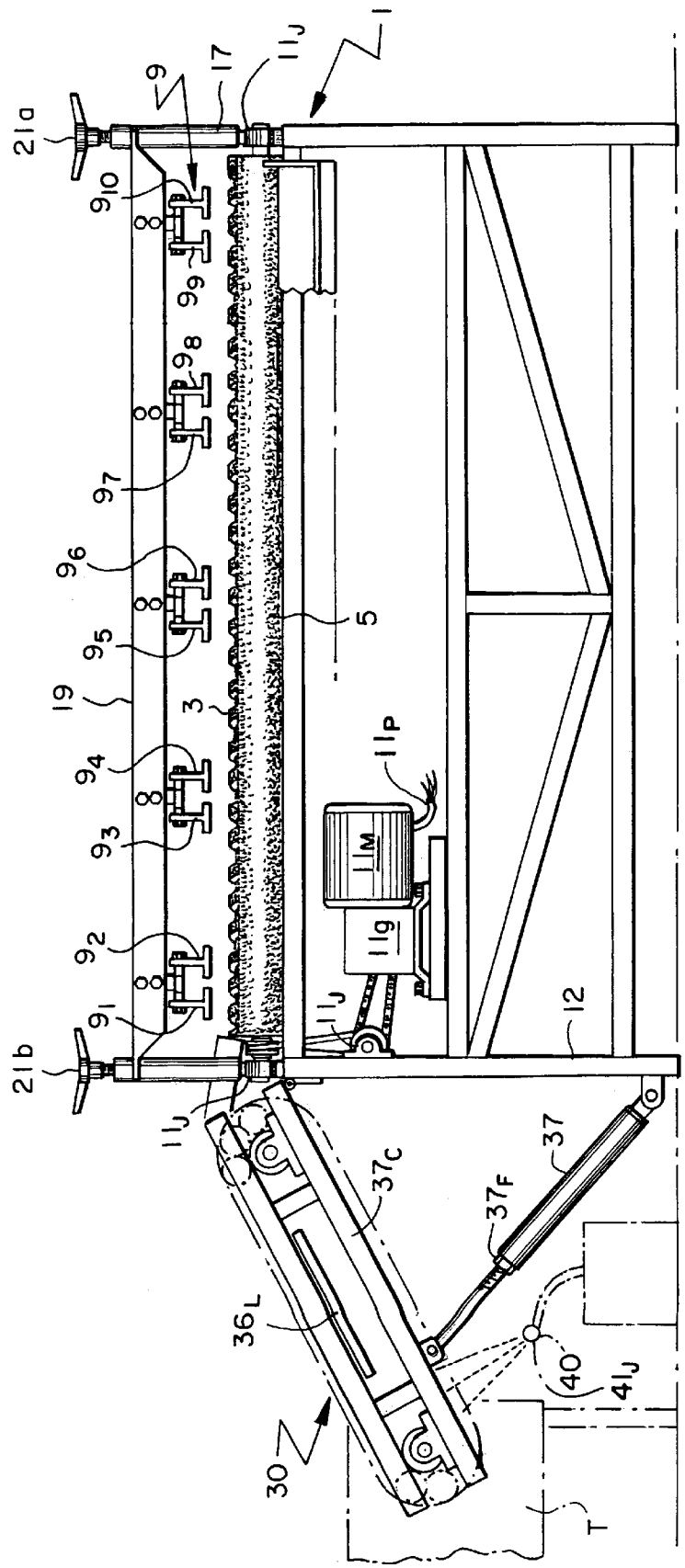
FIG. 1 is an elevational side view of the conveying and applying device of this invention operationally connected to a sorting device which is disclosed in greater detail my parent patent application Ser. No. 08/500,438.

Pursuant to the present invention, there is provided a device (generally referenced as 30) for conveying and rotating rounded objects P within a series of individual retaining cavities 31 equipped to rotate the rounded objects P within the cavitites, said device 30 comprising:

a) a repetitive series of laterally positioned retaining members (generally referenced as 34) equipped with axial mounts $36_A$ so as to permit a rotation of the members 34 while conveying the rounded objects P seat within the members 34, said members 34 individually comprising a retaining member $34_A$ equipped with axial mounting means $36_A$ for axially mounting the member $34_A$, and a pliable recessed region (depicted in FIG. 5 as $34_R$) in juxtaposition to an adjacent pliable recessed region $34_R$ of an adjacently positioned retaining member $34_B$ so as to provide a retaining cavity 31 for separately receiving and retaining one of the rounded objects P therewithin;

b) a continuous conveyor (shown in the form of a pair of laterally disposed continuous chains 33) equipped with lateral mounts $36_A$ for axially mounting the retaining members 34 to the conveyor 33 and supportively conveying the members 34 therewithin; and c) drive means for driving conveyor 33 (shown as drive sprocket $33_D$ sprocketed onto chains 33 and driven by drive shaft $33_S$ which, in turn, is belt-driven by belt $11_B$ operatively connected to reduction gear $11_G$ and motor $11_M$ powered by an electrical source $11_P$) and axially rotating said members 34 while conveying the members 34 along the continuous conveyor 33 so as to provide a rotational movement of conveying and rotating the objects P carried within the cavities 31.

The unique device 30 is generally comprised of a series of laterally positioned retaining members 34 which form a continuous series of conveying cavities 31, a continuous conveyor 33 in the form of laterally disposed chains 33 for axially mounting of the members 34 thereto and rotating means 36 for rotating the member 34 so as to effectuate treatment of the produce pieces P within cavities 31. The laterally positioned conveying members 34 are equipped with axial mounts $36_A$ so as to permit a rotational movement of the members 34 while conveying the rounded pieces P seated within the cavities 31 of conveyor 33. Member $34_A$ is equipped with a pliable recessed region (referenced as $31_A$ for illustrative purposes in FIG. 4) channeled around member $34_A$ and laterally aligned in juxtaposition to an adjacent recessed region (referenced as $31_B$ for illustrative purposes in FIG. 4) of an adjacently positioned member (referenced as $34_B$ for illustrative purposes) so as to provide a cavity 31 (as shown in FIG. 4) for separately receiving and retaining a single rounded object P seated therewithin. Continuous conveyor 33 is equipped with lateral axial mounts $36_A$ for laterally and axially mounting the members 34 to the conveyor 33. The rotating means 36 for axially rotating said members 34 serve to rotate the pieces P within the cavities 31 while also allowing the pieces P to be conveyed by the members 34 along the continuous conveyor 33. The conveying and rotation features of the device 30 uniquely permit the application of a broad spectrum of extrinsic materials to be applied to the rotating pieces. The rotating means 36 may comprise a single rotating means 36 or a plurality of rotating means 36 positioned at staged sequences along conveyor 33. The rotating means 36 may be designed so as to the impart any desired rotational movement or rotational speed to members 34. This allows a host of different treatments or applications to be applied to pieces being conveyed within the cavities 31.

Figure 6:
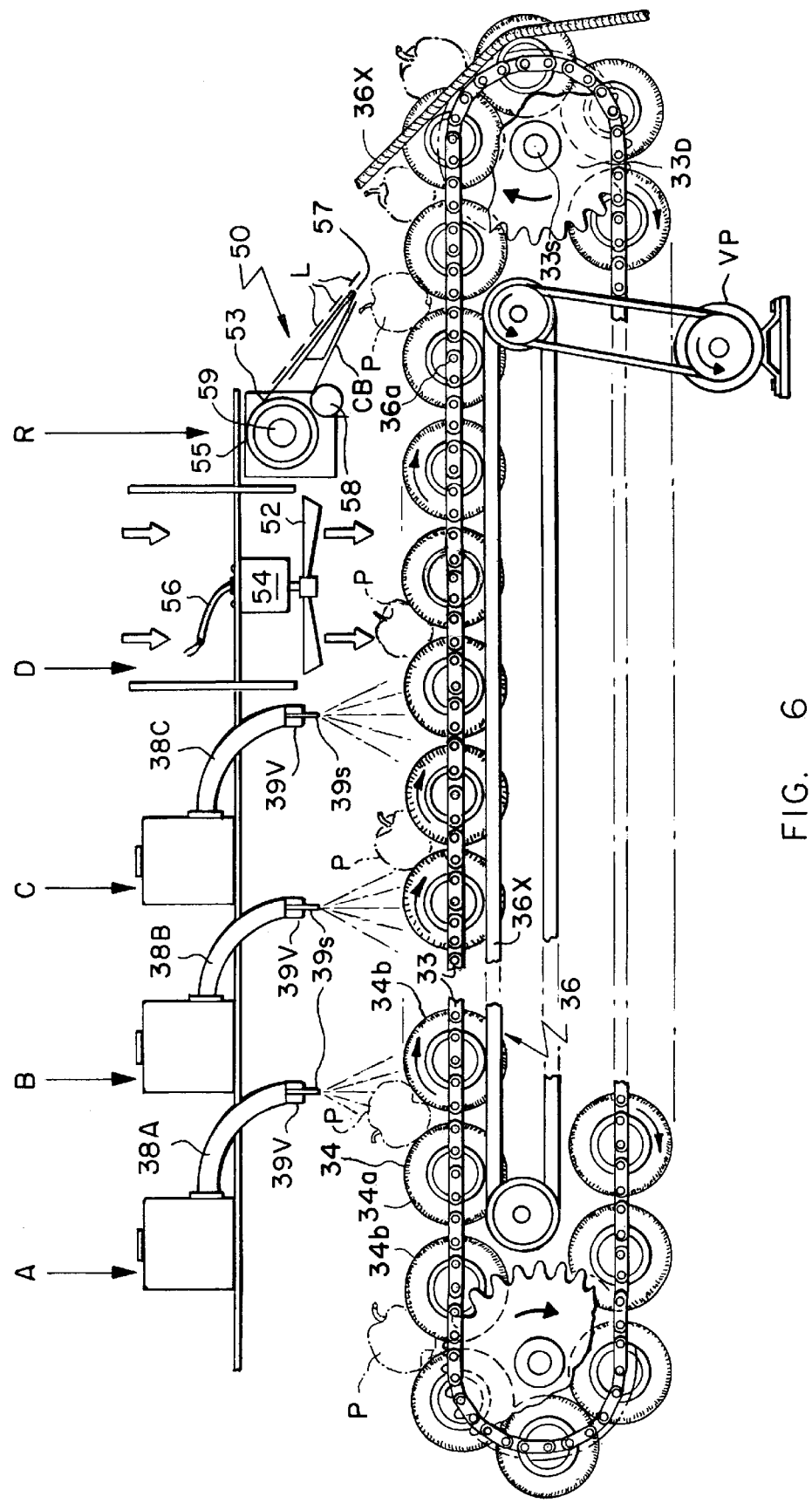
FIG. 6 is another cross-sectional view of the conveyor shown in FIG. 3 further so as to conduct multiple treatments upon conveying products.

The device 30 includes a continuous conveyor fitted with a continuous series of retaining members 34 which form a continuous series of cavities 31. In FIG. 1, a partial showing of members 34 is depicted by circular phantom lines while the continuous conveyor is depicted by the broken phantom line. The cross-sectional view of the conveying device 30 of FIG. 3 depicts a stationary apron $36_L$ for rotating retaining members 34 which are shown in more detail in FIGS. 2–6. The FIG. 2 frontal view is a partial depiction of the conveying and rotating device 30 showing the retaining members 34 assemblage at the feed end and discharge end. The top frontal view of FIG. 4 depicts in greater detail the assemblage of multiple laterally disposed cavities 31 axially mounted to two laterally disposed chains 33. The cross-sectional view of FIG. 6 shows in part a repetitive sequence of cavitated retaining members 34 adapted to pass through a series of applicative or treating zones or stations (A, B, C and D) for applying various treating agents or materials such as a label to products P being conveyed by device 30.

A particular suitable arrangement for providing a series of aligned cavities 31 as depicted in the Figures involves equipping a series of axially mounted shafts or rollers $36_S$ with cylindrical brushes 34 circumscribingly grooved so as to provide a channeled margin $34_R$ for retaining a rounded piece such as a produce piece P therewithin. Each roller mounted $36_S$ may be fitted with one or more cylindrical brushes 34 having bristles $34_P$ arranged upon roller $36_S$ so as to provide a grooved or concave recessed region $34_R$ contoured to partially serve as a seating for piece P. If desired a multiplicity of cavities 31 (e.g. 2, 3, 4, or more) may extend crosswise and transverse to chains 33 so as to increase the processing capacity of device 30. As may be particularly observed from FIGS. 4–5, the grooved recessed region $34_R$ circumscribes each roller $36_R$ so that the rotation of roller $36_S$ will not alter the configuration of the cavities $31_A$ and $31_B$ between brushes $34_A$ and $34_B$. It may also be observed that each brush $34_A$ shares two adjacent cavities 31 with its two immediately positioned adjacent brushes $34_B$. The brush shafts $36_S$ are axially mounted at both ends to conveyer 33 and in a lateral relationship to other shafts $36_S$ so that each recessed region $31_A$ of any given brush $34_A$ forms in cooperation with an adjacently recessed region $31_B$ of two adjacent brushes $34_B$ two complete adjacently positioned and laterally disposed cavities 33 for separately receiving and retaining rounded pieces P therewithin. The conveyor 31 also includes a series of the laterally disposed brushes 34 circumferentially grooved which collectively provide a continuous series of laterally disposed cavities 31 along the entire length of the continuous conveyor 33.

The conveying and rotating device 30 preferably includes drive means 36 for axially rotating the pieces P at a predetermined rotational speed. In the preferred embodiments of the device 30, brushes 34 are designed to axially rotate about shaft $36_S$ when subjected to the rotating means 36 for rotating brushes 34. The rotation of brushes 34 causes produce pieces P carried by the cavities 31 to undergo a rotational movement. This rotational movement arises by reason of the rotational effect the bristles $34_P$ of brushes 34 have upon the produce pieces P as the bristles $34_P$ sweep across the surface of the produce piece P. Cleaning and sanitation of the produce pieces P within the cavities 31 may be effectuated by applying cleaning reagents and other agents such as microbiocides to the rotating pieces P. Similarly, wax coating agents, typically in the form of aqueous wax dispersions, may be applied to provide a wax coated and/or polished produce product using the rotating brushes to rotate the product and to spread the wax coating about the surface while also removing excess water and polishing the surface of the produce.

Figure 2:
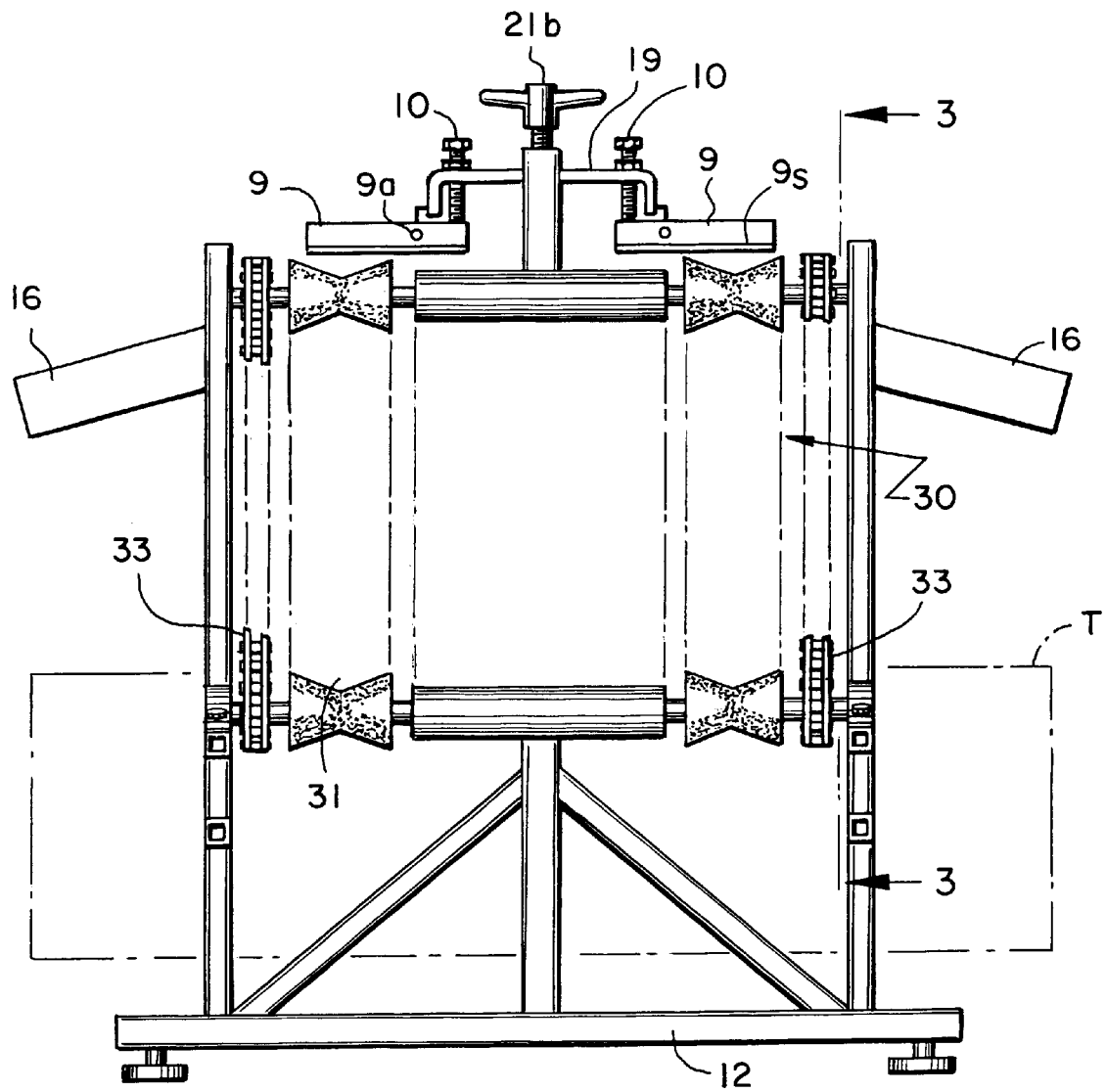
FIG. 2 is a partial front elevational view of the feed conveyor depicted in FIG. 1.

Rotational movement of the brushes 34 may be effectuated by fitting each shaft $36_S$ with a tractional surface $36_T$ and an interfacing locomoting surface $36_L$ in an interfacing relationship to the tractional surface so that interfacial movement of the tractional surface $36_T$ upon the interfacing surface $36_L$ causes rotational movement of the shaft $36_S$ and attached brushes 34. The rotational speed the rotational means 36 may be in the form of a stationary platform or apron 36 as depicted in FIGS. 1 and 2 or a moving apron 36 as shown in FIGS. 1 and 2. The moving apron $36_X$ may be designed to move in one or more directions, and if desired, at various speeds. A rubber winding about shaft $36_S$ or other tractional surface $36_T$ about shaft $36_S$ particularly as depicted in FIGS. 4 and 5 depict a particularly effective tractional surface $36_T$ for shaft $36_S$. An immobile interfacing surface $36_L$ such as the stationary apron $36_L$ as depicted particularly in FIG. 3 or mobile apron $36_X$ operated at varying interfacing speeds or rotational directions so as to vary the direction of the brushes 34 thus provide effective drive means 36 for imparting axial rotation to brushes 34.

The depicted device 30 includes a pair of laterally disposed chains 33 driven by drive shaft $33_S$ drive sprockets $33_D$ and driven about an orbital path as formed by spacer sprockets $33_G$. Sprockets $33_D$ and $33_G$ are supportively carried by an adjustable feed support frame 37 operationally disposed in an inclined ramping position so as to be positionally adapted for placement into a holding tank T (shown by broken lines of FIG. 1) containing for illustrative purposes floating produce pieces P. The feed end of device 30 is equipped with a projecting apron which serves as a point of entry for the floating produce pieces P to the conveying cavities 31. Threaded bolts $37_F$ threading support frame 37 onto chain support frame $37_C$ affords a suitable adjustable means for raising or lowering the inclination of the device 30 and conveyor 33 to the proper produce P feeding level. Although any suitable means for placement of the produce piece P may be used (including manual or mechanical) for placing the produce P within the individual cavities 31 of conveyor 33. The use of holding tank T to provide floating feed pieces serves as a particularly suitable feeding system for feeding raw produce to the conveying device 30. The floating produce pieces are typically allowed to flow uniformly and continuously onto device 30 and cavities 31 without excessive bunching and concomitant injury of the feed for conveyor 33. The incline should be adjusted so as to follow the produce pieces P flow uniformly onto feed apron 39 and fill each available cavity 31 with a produce piece P. The embodiments of the invention as typified by FIGS. 1 and 3 depicts a relatively simple processing use of device 30. The produce piece P taken from tank are wet, and may if desired, include a mild detergent or sanitizing agent. The wetted pieces P undergo a rotational movement which serves to clean pieces P. Further rotational sweeping of brushes 34 across the surfaces of pieces P causes the pieces P to dry.

The conveying and rotating device 30 may serve as a suitable feeding means for feeding the unsorted pieces P to the sorting embodiments disclosed in my co-pending parent application Ser. No. 08/500,438. The feeding means 30 may be effectively used to align unsorted produce P in single file for feeding to sorting device (shown as FIG. 1). The sorting device shown in FIG. 1 includes contacting members (generally referenced as 9) with adjusting means (referenced as 21) for adjusting beam 19 at a proper distance from spiral brush 3 expelling brush 5 and support column 17.

The unique device 30, as depicted by FIGS. 1–6, includes a unique series of retaining cavities 31 laterally disposed between cavitated retaining members 34 carried by a continuous conveyor 33. The cavities 31 effectively serve to separately transmit, within each cavity 31, a single piece P from an appropriate feed source such as a produce holding tank T. While transporting the piece P, the retaining members 34 may effectively function as rotational cleaning members 34 which gently brush against produce pieces P in a unitary direction causing a rotational movement of each pieces P within each cavity 31. The individual and intermittent depositing of individual produce pieces P within the conveying cavities 31 of device 30 allows for separate treatment, conveyance and delivery of produce P without any bunching of produce pieces P.

With particular reference to FIGS. 3–5, grooved cylindrical brushes 34 may sized to receive and seat the pieces P to be transported by device 30. Brushes 34 are laterally positioned and axially mounted to chain conveyor 33 in a repetitive sequence so as to provide a series of continuous conveying cavities 31. The cylindrical brushes 34 include recessed bristled regions $34_R$ placed in juxtaposition to recessed bristled regions $34_R$ (e.g. see FIG. 5) of an adjacently positioned brushes $34_B$ so as to provide a series of sequential aligned conveying cavities 31. Each shaft $36_S$ may be fitted with two or more brushes 34. FIG. 4 depicts two cylindrical brushes 34 secured at opposite ends of a shaft $36_S$. Shafts $36_S$ fitted with paralleled aligned grooved cylindrical brushes 34 are axially mounted to chain conveyor 33 at mount $36_A$ in a laterally spaced relationship sufficient to provide a cavity 31 for retaining and conveying a separate piece P such as a produce piece P therewithin. The bristled regions $34_P$ of each brush 34 includes a circumscribing concave bristled section $34_R$ configured to seat a particular produce piece P within cavities 31 for cleaning or treating while conveyed by device 30.

As illustrated by FIG. 6, the conveying and applying device 30 is particularly well adapted to conduct a multiplicity of treatments or applications as product P is being rotated and conveyed by conveyor 31. A series of treatment stations or zones (shown as A, B, C and D) may be combined with the conveying and treating device 30 of this invention. The ability to simultaneously conduct a multiplicity of treatments while simultaneously conveying and rotating pieces is exemplified by the various treatments or applications of materials involved in the processing of apples P or other produce P. The applying stations A, B, C and D may include a treating agent feed source (shown as holding tanks A, B and C), conduits $38_A$, $38_B$ and $38_C$ for conducting the treating agent to valves $39_V$ or other regulating means for regulating the amount of treating agent to be applied to the conveyed pieces P and onto spraying nozzles $39_S$ for spraying the respective treating agents onto the produce P.

As apples P are fed from as suitable source such as tank T (shown in FIG. 1) and conveyed along conveyor 33 by the cavitated retaining members 34, the apples P as depicted in FIG. 6 may be conveyed past a first treatment zone A such as a wash station wherein an aqueous wash (e.g. mild soap) is jetted or sprayed onto apples P passing beneath the wash station of zone A. A water wash from tank A, conducted through conduit $38_A$ and valve 38 to spray nozzle $39_S$ positioned above cavities 31 sprays the water wash onto the passing apple P. The zone A treatment may be conducted in cooperative association with a rotational movement of brushes 34. Rotational movement may be effectuated by shafts $36_S$ contacting against the interfacing of moving apron $36_X$ surface, whereupon brushes 34 commence to undergo rotational movement as illustrated in FIG. 6. The rotational movement of brush 34 causes the produce piece P to rotate within cavity 31 by its brushing against bristles $34_P$ of brushes 34.

After the washed apple P has undergone the wash treatment, apple P is then passed beneath a subsequent rinse treatment station B wherein a pretreated rinse housed in tank B, conducted through conduit $38_B$ and valve $39_V$ and is then applied by spraying or jetting the rinse through spray nozzle $38_S$ onto the surface of apple P. Similar to the wash treatment, the pretreatment rinse may capitalize upon a rapid rotational movement of apple P within cavity by rotating the shafts $36_S$ of the brushes 34 with a stationary or moving belt $36_X$ to expedite its subsequent treatment. From a processing viewpoint, the cooperative interaction between brushes $36_B$ and produce P accelerates the evaporation rate of water from the surface of apple P which permits the treatment to be more effectively completed before the next ensuing treatment.

As illustrated in FIG. 6, stage C may include a third treatment zone such as applying an aqueous wax dispersion from tank C, through conduit $38_C$, valve $39_V$ and spray nozzle $39_S$ onto the apples P as the apple P passes beneath treatment zone C. As opposed to the stationary apron $36_L$ the over-all processing shown in FIG. 6 utilizes a moving apron powered by a variable speed and reversible locomoting means 36 for rotating members 34. By subjecting the treatment to rotational movement as mentioned before, uniform distribution of wax dispersion upon the apple P surface can be effectuated with the conveying and treating device 30 of this invention. Normally the water carrier for the wax emulsion is allowed to evaporate from the surface leaving a dull wax surface coating upon the apple P surface. The variable speed and reversible locomating means 36 for driving members 34 effectively accelerates the polishing and drying of the wax emulsion treated apples P. If desired the apples may be passed through polishing rolls such as used in the sorting device depicted in the drawings and disclosed in my co-pending application Ser. No. 08/500,438, the desired polishing effect can be imparted to the apple P.

The device 30 may be suitably fitted with sanitizing means 40 to periodically or continuously decontaminate or clean the treating members 34 as illustrated in FIG. 3. Since produce pieces P are readily susceptible to microbial contamination, it is desirable to periodically decontaminate the device 30 on a periodic basis. Contamination of the device 30 may result in inoculation of the processed produce pieces P with microbial contaminates which then may lead to premature spoilage of the produce P. Disinfecting jets ($41_J$) connected to disinfectant source 40 for spraying disinfectants upon the produce pieces P or brushes 34 upon each revolution of the conveying brushes 34 affords a particularly effective sanitizing means 40 for protecting the processing equipment and processed produce against costly microbial contamination. Preservatives, sanitizing and cleansing reagents (e.g. germicides, insecticides, fungicides, soaps, etc.), coloring additives, polishing agents such as emulsified waxes, or other coating agents, etc. may be appropriately used at the sanitizing means 40 or at treatment zones (e.g. A, B, C and D) to produce treated pieces P which may then passed onto further sorting device 1 processing such as feeding to or other processing. Uniform distribution of the reagent additives from means 40 treatment or zones A, B, or C upon the conveyed food piece P is effectively accomplished by rotating and sweeping the piece surface across the bristled region $34_P$ of brush 34. As particularly illustrated by FIGS. 1 and 3, cleaning of the produce piece P may be effectuated by simply sweeping the bristles $34_P$ of the brush 34 across the produce piece P surface in the presence of an appropriate cleansing agent which, in some instances, may simply constitute a water wash from tank T. The rotation of the produce pieces P upon the brushes 34 accelerates evaporation and drying of water adhering to the produce piece P surface. Sanitizing reagents admitted to the feed side will typically sanitized the pieces and be carried over to the sorting equipment side of the process and remain, if desired, as a protection and stabilize upon the sorted produce.

With particular reference to FIG. 6, the feed conveyor 30 may also equipped with a locomoting means $36_X$ for reversing the rotational direction of the cleaning members 34 at the exiting end of conveyor 30. Reversal of the rotation enables the cleaning members 34 to more effectively expel the feed produce P as well as accelerate the drying of pieces P. This also prevents jamming of the conveyor by unexpelled feed pieces. An elastic reverse rotation strap $36_X$ (e.g. such as a rubber strap, bungee cord, etc.) for stretched tautly against tractive surface $36_T$ as depicted in FIG. 3 will effectively serve to reverse the rotation of cleaning members 34 at the feed exit end.

Zone D illustrates the utilization of forced air to accelerate the evaporation of moisture from apples P. The movement of air as shown is effectuated by a fan 52 driven by fan motor 54 connected to a suitable electrical power source by electrical chord 56.

The conveying and rotating features allow device 30 to be used to apply a broad range of extrinsic materials to rounded pieces P. If desired three different rotational means for imparting different rotational movements to brushes 34 may be used in the various applying zones. For example, following the first treatment zone A, the tractive surfaces $36_T$ of shafts $36_S$ may contact against the tractive surface of stationary platform $36_L$ as shown in FIG. 3 which applies a constant rotational speed to brushes 34. The brushes 34 carrying produce P may then pass treatment zone B and (as illustrated in FIG. 6) wherein shafts $36_S$ make interfacial contact against a mobile belt 36 connected to a variable power source $V_P$ which drives the shafts in opposite direction from the chain 33 direction and effectuates a backward rotation upon the brushes 34. The speed at which the brushes rotate may be regulated by speed of the variable power source. The final treatment zone C is followed by another variable speed belt $36_X$ which interfacial contacts against a plurality of brush shafts $36_S$ and operates in reverse direction from belt zone B.

FIG. 6 also illustrates the use of the device in applying pressure sensitive labels or self-adhesive labels to rotating pieces P while the pieces P are being conveyed by conveyor 34. A conventional label applicator 50 loaded with pressure-sensitive labels L positioned in relationship to the conveyed pieces so that the self-adhesive portion of label L contacts a piece P passing through the application zone 4 of applicator (generally referenced on 50) serves to adhesively apply the contacting portion of label L to piece P. The labeler 50 includes a receptacle 53 housing a roll of self-adhesive labels L placed upon the applicator reel 55, applicants nose member 57, tension pulling 58 and unwinding reel 59 connected to a suitable power source (not shown), for rotating unwinding reel 59. Labels L are adhesively affixed to calendar stock backing $C_B$, which is unwound from reel source R, pulled about nose number 57 and tension pulley 58 by unwinding reel 59. Waxed stock backing $C_B$ is unwound from reel R onto unwinding reel 59 as labels L are applied to product P. The speed of the wax stock backing $C_B$ is synchronized so as to apply labels L to product P retained within the cavities 31 at the end of the nose member 57. As piece P continues its rotation within the cavity 31, the attached portion of label L is pulled and separated from applicator 50 and placed onto piece P. The spinning or rotational force of rotating piece P pulls the label L from the applicator 50 and stretches it across the surface of piece P so that pressure-sensitive label L is applied to piece P. The affixed label L is pulled torn from the applicator 50 and the new label L is the positioned for attachment and labeling onto the next succeeding piece P passing beneath the applicator 50.

In a similar manner, device 30 may be utilized to remove paint from aluminum cans or receptacles P. The cans P may be placed in tank T filled with a paint solvent and the cans are then transported through zones A, B and C (in which solvent or rinse solutions wash are jetted onto the cans P rotating within cavities 31).

In another embodiment of the invention, there is provided a device for orientating pieces and applying informational decals to the oriented pieces as disclosed further in my copending application Ser. No. 08/500,438 including FIGS. 1–15 therein, all of which is incorporated herein by reference. The spinning motions of the propelling brush 3 and the expelling brush 5 have been found to align irregular rounded or oblong shaped pieces P of cored fruits, such as apples and pears, within the trough 7 namely, by aligning the fruit core so it aligns substantially parallel to the longitudinal axis of the brushes 3 and 5 as illustrated in my copending application Ser. No. 08/500,438. This uniform aligning and positioning of irregular-shaped pieces P also allows these pieces P to be accurately sized and sorted because of the uniformity in orientation of each piece P making contact onto the contacting member 9. For example, apples are taller than they are wide. If the apples were not positioned uniformly within trough 7, some apples would be sorted by their width while other apples would be sorted by their height. This, in turn, would lead to non-uniform size sorting.

Particularly effective aligning means for aligning produce pieces P so that the major longitudinal axis of the produce piece P becomes aligned to the major longitudinal axis of trough 7 involves the use of spiral brushes 3 equipped with stepped or flighted channels as illustrated by FIG. 9 of my copending application Ser. No. 08/500,438. As shown in my copending application FIG. 9, the flighted or stepped spiral brush 3 contains two or more furrowed channels ($3_C$ and $3_F$) of varying recessed depth and, if desired as shown, furrowed width. The deeper furrowed channel $3_C$ of the spiral brush 3 serves as a seat for the bulbous or butt section of the produce P while the steeped furrowed section $3_F$ of lesser depth serves as a seat for the neck of the produce piece P. Irregularly shaped fruit and vegetable pieces P and especially those having a bulbous and necked sections such as apples, pears, etc. may be effectively axially aligned by this technique. In the case of Red Delicious apples of an unsorted size and ranging from about 4½" to about 2" in diameter size, a flighting of the deeper grooved channel $3_C$ to a depth of about ¾" to about 1¼" (preferably at about 1"), a width ranging from about ¾" to about 1¼" (preferably about 1") and the shallower channel $3_F$ to a recessed depth ranging from about ¼" to about ¾" (preferably at a depth of about ½") and a channel width ranging from about ¾" to about 1¼" (preferably at a channel width of about 1") provides a particularly effective technique for aligning the delicious apples P along trough 7. For pears the same flighting would apply except the deepest grooved channeled would preferably be about 1¼" in depth by reason the pear bulbous section is larger in size than the apple. After the produce piece P becomes aligned as shown in FIG. 7, the label may be applied to the correct position by manual application or by conventional mechanical label applying devices. The uniform positioning and orientation of cored produce provides a unique method for applying self-adhering labels to produce pieces P. The proper label placement typically necessitates labeling in a bulged region in a plane aligned along the major axis of the fruit piece P. As the pieces P move through trough 7, labels by conventional labeling techniques may be properly placed in a substantially uniform positioning upon each piece P. This permits apples to be labeled with a label which may be readily read by the consumer by viewing slightly above its axial core in the bulbous region of the apple.

What is claimed is:

1. A device for conveying and rotating rounded objects within a series of retaining cavities, said device comprising:
   a) A repetitive series of laterally positioned retaining members equipped with axial mounts so as to permit a rotation of the members while conveying the rounded objects with the members, said members individually comprising a retaining member equipped with axial mounting means for axially mounting the member, and a recessed region of pliable projections in juxtaposition to an adjacent recessed region of an adjacently positioned retaining member so as to provide a pliable retaining cavity for separately receiving and retaining one of the rounded objects therein:
   b) a continuous conveyor equipped with lateral mounts for axially mounting the axial mounting means of the retaining members to the conveyor; and
   c) drive means for driving the conveyor and axially rotating said members so as to thereby rotate the objects within the cavities while continuously conveying the members along the continuous conveyor.

2. The device according to claim 1 wherein the retaining members comprise cylindrical brushes axially mounted to the conveyor.

3. The device according to claim 2 wherein the brushes include recessed bristled regions placed in juxtaposition to the recessed bristled regions of adjacently positioned brushes so as to provide the series of retaining cavities laterally disposed between the brushes.

4. The device according to claim 3 wherein the cylindrical brushes are attached to laterally disposed shafts axially mounted to the conveyor.

5. The device according to claim 4 wherein the laterally disposed shafts are equipped with at least two of the cylindrical brushes for each shaft and wherein the bristled regions of said brushes include a concave bristled section contoured to mate onto the objects to be conveyed by said device.

6. The device according to claim 5 wherein the bristled regions are sized to retain a produce piece as the objects therein.

7. The device according to claim 2 wherein the drive means for conveying and axially rotating the brushes includes a variable drive means for axially rotating the brushes at a predetermined rotational speed.

8. The device according to claim 1 wherein the continuous conveyor includes laterally disposed chains disposed in an inclined ramping position and a projecting feed end for positioning and placement into a holding tank containing an aqueous media for feeding the pieces to the continous conveyor.

9. The device according to claim 4 wherein the shafts include a tractional surface and the device includes an interfacing tractive surface positioned in an interfacing relationship to said tractional surface so that movement of the tractional surface upon said interfacing surface causes rotational movement of said shafts and said brushes.

10. The device according to claim 9 wherein the interfacing surface includes mobile means for locomoting the interfacing surface and thereby altering the rate of rotational movement of said brushes and said shafts.

11. The device according to claim 10 wherein the mobile means include a variable speed motor for regulating locomotive speed of the interfacing surface.

12. The device according to claim 9 wherein the interfacing surface comprises a continuous frictional apron powered by a variable speed motor.

13. A method for conveying and rotating rounded pieces within separate and individual cavities for each of said pieces, said process comprising:
   a) conveying the pieces while separately retaining an individual piece within a retaining cavity laterally positioned between adjacently positioned retaining members equipped with a recessed region of pliable projections in each of the retaining members which separately serve to support the individual pieces retained within the retaining cavity; and
   b) rotating the pieces within the cavities by sweeping the pliable projections of the retaining members across an external surface of the pieces to cause the pieces to rotate within said cavities.

14. The method according to claim 13 wherein the retaining members comprise laterally positioned bristled brushes equipped with axle mounts and a tractile surface so as to permit rotary movement of the brushes and the method includes an additional step of adding a washing agent to the pieces and the sweeping comprises sweeping the bristled brushes across the pieces to cause the pieces to rotate upon the brushes so as to clean the surface of the pieces with the washing agent.

15. The method according to claim 13 wherein the method includes applying multiple treating materials to the pieces and the rotating of the pieces with the treating materials to effectuate treatment of the pieces with said materials.

16. The method according to claim 13 wherein the method includes applying an adhesive label to the pieces while rotating the pieces within the cavities.

17. The method according to claim 15 wherein the method includes applying an aqueous medium to the pieces and thereafter evaporating water from the pieces while rotating the pieces within the cavities.

18. The method according to claim 14 wherein the rotating includes locomoting the tractile surface against a locomoting surface.

19. The method according to claim 18 wherein the locomoting surface comprises a moving locomoting surface which interfacially engages the tractile surface and causes the members to rotate.

20. A conveying device adapted to individually receive and retain a round piece while rotating and conveying the piece, said machine comprising:
   a) a series of cylindrical brushes laterally disposed along a continuous conveyor with said series of brushes being laterally aligned to provide a concave recessed bristled zone formed by recessed bristles of adjacently positioned brushes so as to form a recessed cavity for the receiving and the retaining the round piece therewithin;
   b) an axial mounting means for axially mounting the series of the brushes to the conveyor; and
   c) power means for continuously conveying the piece with said conveyor while causing the series of the brushes to rotate about the axial mounting means and thereby cause the piece to spin within the recessed cavity while conveying the piece therewithin.

\* \* \* \* \*